US012674690B2

(12) United States Patent
Watanabe

(10) Patent No.: US 12,674,690 B2
(45) Date of Patent: Jul. 7, 2026

(54) MAGNETIC SENSOR AND MAGNETIC SENSOR SYSTEM

(71) Applicant: TDK Corporation, Tokyo (JP)

(72) Inventor: Kazuya Watanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 128 days.

(21) Appl. No.: 18/616,564

(22) Filed: Mar. 26, 2024

(65) Prior Publication Data

US 2024/0328834 A1    Oct. 3, 2024

(30) Foreign Application Priority Data

Mar. 31, 2023    (JP) ................................. 2023-058949

(51) Int. Cl.
G01D 5/244            (2006.01)

(52) U.S. Cl.
CPC ....... G01D 5/24485 (2013.01); G01D 5/2448 (2013.01); *G01D 2205/20* (2021.05)

(58) Field of Classification Search
CPC ........... G01D 5/12; G01D 5/14; G01D 5/142; G01D 5/145; G01D 5/16; G01D 5/244; G01D 5/24471; G01D 5/2448; G01D 5/24485; G01R 33/02; G01R 33/0206; G01R 33/09–098
See application file for complete search history.

(56) References Cited

U.S. PATENT DOCUMENTS

| | | | |
|---|---|---|---|
| 2005/0028614 A1* | 2/2005 | Saito ..................... | G01D 3/0365 |
| | | | 73/862.333 |
| 2005/0270020 A1* | 12/2005 | Peczalski ........... | G01R 33/0206 |
| | | | 324/252 |
| 2010/0321008 A1 | 12/2010 | Mita et al. | |
| 2011/0031965 A1* | 2/2011 | Saruki ................ | G01D 5/24476 |
| | | | 324/207.25 |
| 2012/0068698 A1* | 3/2012 | Chen ..................... | G01R 33/098 |
| | | | 324/252 |
| 2013/0073238 A1* | 3/2013 | Nomura ................. | G01R 33/09 |
| | | | 324/252 |
| 2014/0266187 A1* | 9/2014 | Mather ................ | G01R 33/096 |
| | | | 324/252 |
| 2016/0327618 A1* | 11/2016 | Yuan ..................... | G01R 33/096 |
| 2017/0350726 A1 | 12/2017 | Watanabe et al. | |
| 2019/0195968 A1* | 6/2019 | Yuan ................... | G01R 33/0094 |
| 2020/0386577 A1* | 12/2020 | Uchida .................. | G01D 5/145 |
| 2020/0386831 A1 | 12/2020 | Saruki et al. | |
| 2021/0293538 A1* | 9/2021 | Mochizuki ........... | G01R 33/091 |

* cited by examiner

*Primary Examiner* — Huy Q Phan
*Assistant Examiner* — David B Frederiksen
(74) *Attorney, Agent, or Firm* — Oliff PLC

(57) ABSTRACT

A magnetic sensor includes a first MR element disposed on an inclined surface and configured to generate a first detection signal, a second MR element disposed on an inclined surface and configured to generate a second detection signal, and a conversion section configured to convert the first detection signal and the second detection signal into a first corrected signal and a second corrected signal, respectively. The conversion section is configured to change an amplitude of at least either one of the first and second detection signals to make a ratio of the amplitude of the second corrected signal to the amplitude of the first corrected signal different from a ratio of the amplitude of the second detection signal to the amplitude of the first detection signal.

16 Claims, 17 Drawing Sheets

1

110

114
113
112
111

MAGNETIC SENSOR AND MAGNETIC SENSOR SYSTEM

CROSS REFERENCE TO RELATED APPLICATIONS

This application claims the benefit of Japanese Priority Patent Application No. 2023-058949 filed on Mar. 31, 2023, the entire contents of which are incorporated herein by reference.

BACKGROUND

The technology relates to a magnetic sensor including magnetic detection elements each disposed on an inclined surface, and a magnetic sensor system.

In recent years, angle sensor devices have been widely used in various applications, such as detection of the rotational position of a steering wheel or a power steering motor in an automobile. The angle sensor devices generate an angle detection value having a correspondence with an angle to be detected. Examples of the angle sensor devices include a magnetic angle sensor device using a magnetic sensor. The magnetic angle sensor device typically includes a magnetic field generator that generates a magnetic field whose direction rotates in response to the rotation or linear movement of an object. The magnetic sensor is configured to detect a magnetic field that changes in terms of at least either the direction or the strength within a predetermined plane (hereinafter, referred to as a target magnetic field) among magnetic fields generated by the magnetic field generator.

Assume an orthogonal coordinate system defined by mutually orthogonal X-, Y-, and Z-axes. Assume also that a target magnetic field has a constant strength and rotates about the X-axis. The direction of the target magnetic field can be detected by magnetic detection elements such as magnetoresistive elements formed on a surface parallel to a YZ plane. However, in some cases, magnetic detection elements formed on a surface parallel to a non-YZ plane intersecting the YZ plane at a dihedral angle other than 90° may be desired for detecting the direction of the target magnetic field. The magnetic detection elements formed on the surface parallel to the non-YZ plane can detect a magnetic field component whose direction and strength change within the non-YZ plane. The direction and strength of the magnetic field component change with a change in the direction of the target magnetic field. An angle that the direction of the magnetic field component forms with a predetermined direction has a correspondence with an angle that the direction of the target magnetic field forms with the predetermined direction.

The direction of the magnetic field component can be detected by using a magnetic sensor that includes a detection signal generation section that generates first and second detection signals, which have a phase difference of 90°. The angle that the direction of the magnetic field component forms with the predetermined direction can be determined by angle calculation using the first and second detection signals.

As described above, the strength of the magnetic field component changes depending on the direction of the target magnetic field. When the direction of the target magnetic field changes cyclically with a predetermined period, the waveform of each of the first and second detection signals is thus distorted from an ideal sinusoidal curve. The distortion in the waveform of each of the first and second detection signals causes an error in the value determined by the angle calculation.

US 2010/0321008 A1 discloses a rotation-angle-detecting apparatus that multiplies at least one of two output voltage values, one in the radial direction and the other in the rotational direction, by a conversion coefficient and calculates a rotation angle from the corrected two output voltage values. US 2017/0350726 A1 discloses a technique for reducing an error of an angle sensor. In this technique, an operation with an error-reducing correction term is incorporated into a conversion operation performed on detection signals. The conversion operation includes an offset correction operation, an amplitude correction operation, and a phase correction operation.

US 2020/0386831 A1 discloses a magnetic sensor for detecting a magnetic field to be detected whose direction changes within a predetermined plane by using a magnetoresistive element disposed on an inclined surface intersecting a predetermined plane at a dihedral angle other than 90°.

US 2010/0321008 A1 and US 2017/0350726 A1 are predicated on the use of a magnetoresistive element formed on a surface parallel to a predetermined plane to detect a magnetic field to be detected whose direction changes within the predetermined plane. US 2010/0321008 A1 and US 2017/0350726 A1, unlike US 2020/0386831 A1, are not assumed to use a magnetoresistive element disposed on an inclined plane to detect the magnetic field to be detected.

SUMMARY

A magnetic sensor according to one embodiment of the technology includes:

a support member having at least one inclined surface inclined relative to a reference plane;

a first magnetic detection element disposed on the at least one inclined surface and configured to detect a target magnetic field and generate a first detection signal;

a second magnetic detection element disposed on the at least one inclined surface and configured to detect the target magnetic field and generate a second detection signal having a phase different from that of the first detection signal; and a conversion section configured to convert the first detection signal and the second detection signal into a first corrected signal and a second corrected signal, respectively, the conversion section being configured to change an amplitude of at least either one of the first and second detection signals to make a ratio of the amplitude of the second corrected signal to the amplitude of the first corrected signal different from a ratio of the amplitude of the second detection signal to the amplitude of the first detection signal.

A magnetic sensor system according to one embodiment of the technology includes the magnetic sensor according to one embodiment of the technology and a magnetic field generator that generates the target magnetic field.

In the magnetic sensor and the magnetic sensor system according to one embodiment of the technology, the conversion section changes the amplitude of at least either one of the first and second detection signals to make the ratio of the amplitude of the second corrected signal to the amplitude of the first corrected signal different from the ratio of the amplitude of the second detection signal to the amplitude of the first detection signal. According to one embodiment of the technology, an error in a detection value generated using the first and second detection signals can thus be reduced.

Other and further objects, features and advantages of the technology will appear more fully from the following description.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
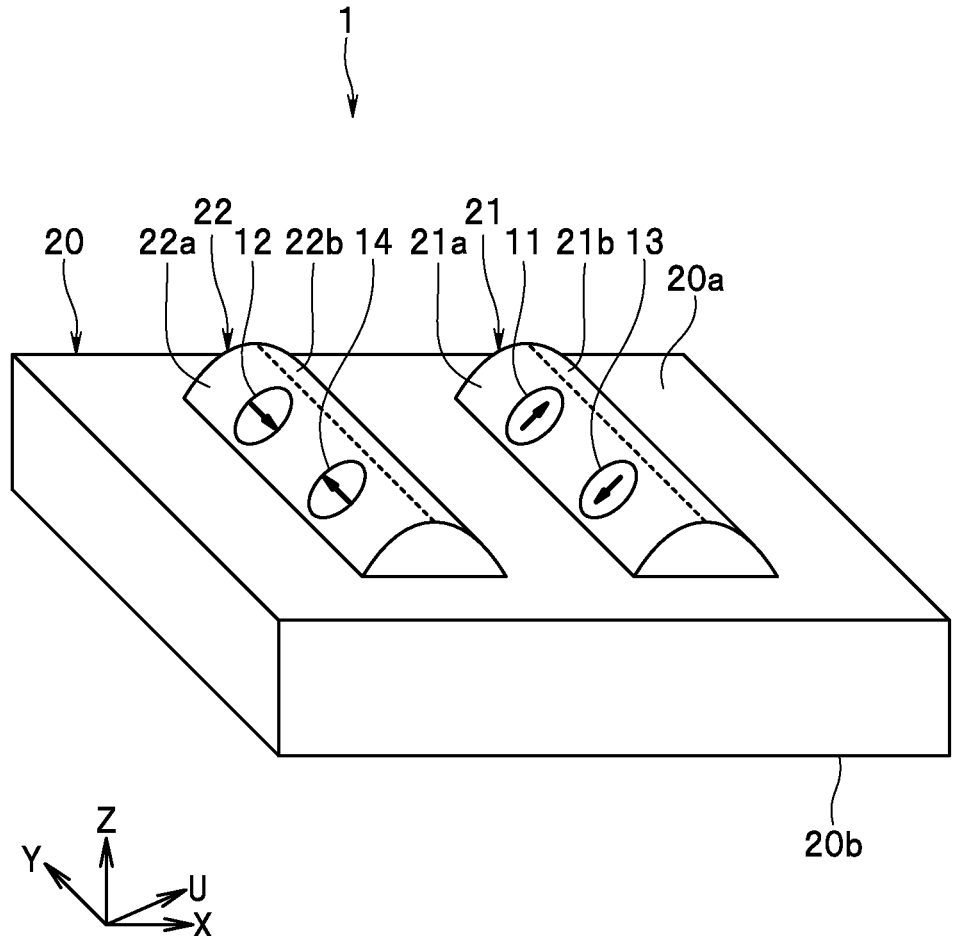
FIG. 1 is a perspective view showing a magnetic sensor according to a first example embodiment of the technology.

An object of the technology is to provide a magnetic sensor and a magnetic sensor system that can reduce an error in a detection value generated using a plurality of detection signals generated by a magnetic sensor including a magnetic detection element disposed on an inclined surface.

In the following, some example embodiments and modification examples of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions. Note that the description is given in the following order.

First Example Embodiment

Figure 2:
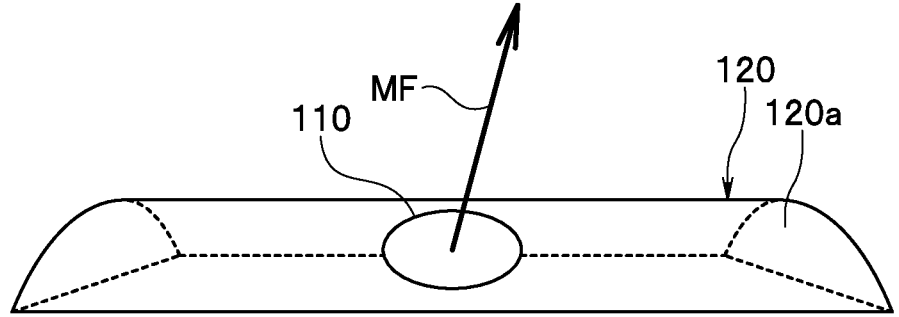
FIG. 2 is a front view showing one of projections shown in FIG. 1.
Figure 2:
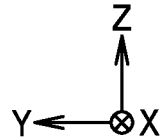
Figure 3:
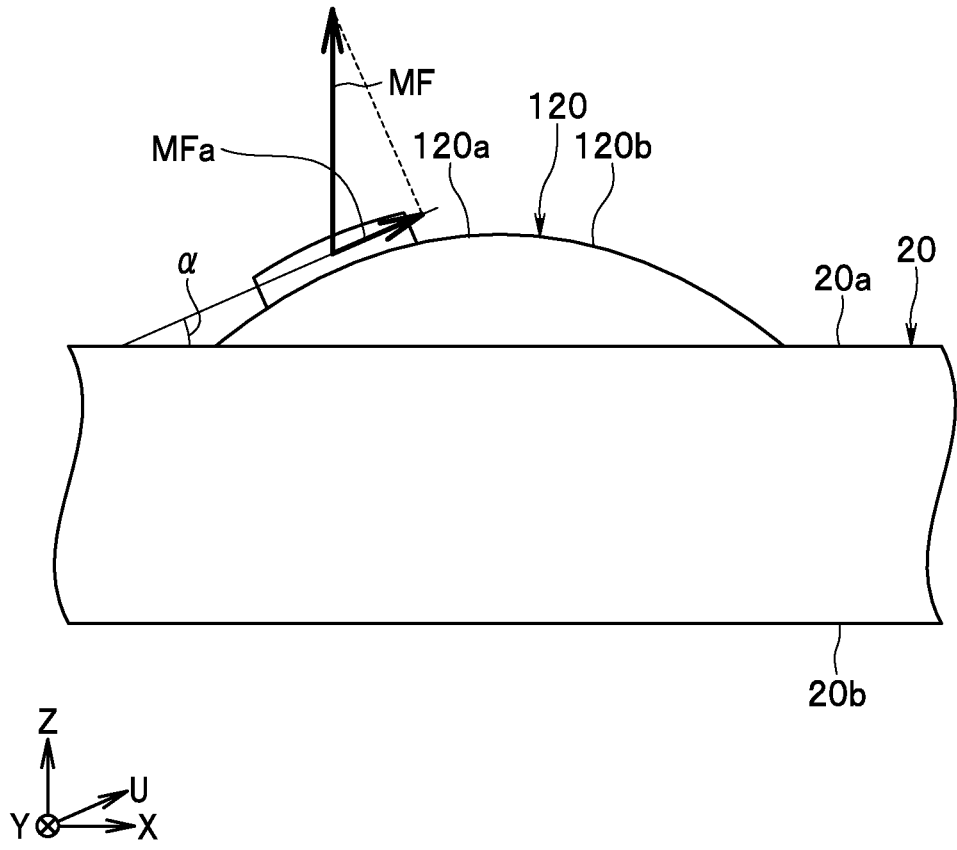
FIG. 3 is a side view showing one of the projections shown in FIG. 1.

First, a configuration of a magnetic sensor according to a first example embodiment of the technology will be described with reference to FIGS. 1 to 3. FIG. 1 is a perspective view showing a magnetic sensor according to the example embodiment. FIG. 2 is a front view showing one of projections shown in FIG. 1. FIG. 3 is a side view showing one of the projections shown in FIG. 1.

A magnetic sensor 1 according to the example embodiment includes a first magnetic detection element, a second magnetic detection element, a third magnetic detection element, and a fourth magnetic detection element. In particular, in the example embodiment, magnetoresistive elements are used as the first to fourth magnetic detection elements. The magnetoresistive elements will hereinafter be referred to as MR elements. The first magnetic detection element will be referred to as a first MR element 11, the second magnetic detection element a second MR element 12, the third magnetic detection element a third MR element 13, and the fourth magnetic detection element a fourth MR element 14.

The magnetic sensor 1 further includes a plurality of not-shown electrodes for supplying a current to the first to fourth MR elements 11 to 14.

The magnetic sensor 1 further includes a support member 20 that supports the first to fourth MR elements 11 to 14. The support member 20 has a top surface 20*a* and a bottom surface 20*b*. For example, the support member 20 may be a structure including a substrate and a plurality of insulating layers stacked on the substrate.

Now, we define X, Y, and Z directions as shown in FIGS. 1 to 3. The X, Y, and Z directions are orthogonal to one another. In particular, in the example embodiment, the Z direction refers to a direction that is perpendicular to the top surface 20*a* of the support member 20 and directed from the bottom surface 20*b* to the top surface 20*a* of the support member. The opposite directions to the X, Y, and Z directions will be referred to as −X, −Y, and −Z directions, respectively.

Hereinafter, the term "above" refers to positions located forward of a reference position in the Z direction, and "below" refers to positions opposite from the "above" positions with respect to the reference position. For each component of the magnetic sensor 1, the term "top surface" refers to a surface of the component located at the end thereof in the Z direction, and "bottom surface" refers to a surface of the component located at the end thereof in the −Z direction. The phrase "when seen in the Z direction" means that an object is seen from a position at a distance in the Z direction.

The bottom surface 20b of the support member 20 is a plane parallel to an XY plane. The bottom surface 20b of the support member 20 corresponds to a "reference plane" of the technology. The top surface 20a of the support member 20 may also be a plane parallel to the XY plane.

The support member 20 includes projections 21 and 22 arranged in a direction parallel to the X direction on the top surface 20a of the support member 20. Each of the projections 21 and 22 projects in the Z direction from the top surface 20a of the support member 20. Each of the projections 21 and 22 extends in a direction parallel to the Y direction. Each of the projections 21 and 22 may have a shape symmetrical or near symmetrical about a YZ plane.

The surface of each of the projections 21 and 22 is a convex surface bulging out in a direction away from the top surface 20a of the support member 20 (Z direction). This convex surface extends in the direction parallel to the Y direction. The entire shape of the convex surface is a semi-cylindrical curved surface.

The surface of the projection 21 includes an inclined surface 21a and an inclined surface 21b. The inclined surface 21a refers to the surface of the projection 21 on the −X direction side of the top end of the projection 21. The inclined surface 21b refers to the surface of the projection 21 on the X direction side of the top end of the projection 21. In FIG. 1, the top end of the projection 21, i.e., the border between the inclined surfaces 21a and 21b is shown in a dotted line. The inclined surfaces 21a and 21b may have a shape symmetrical or near symmetrical about the YZ plane intersecting the top end of the projection 21.

The foregoing description of the surface of the projection 21 also applies to the projection 22. A description of the surface of the projection 22 is given by replacing the projection 21 and the inclined surfaces 21a and 21b in the foregoing description of the surface of the projection 21 with the projection 22 and inclined surfaces 22a and 22b, respectively.

The inclined surfaces 21a, 21b, 22a, and 22b correspond to "at least one inclined surface" of the technology. The first to fourth MR elements 11 to 14 are disposed on at least one inclined surface. In particular, in the present example embodiment, the first and third MR elements 11 and 13 are disposed on the inclined surface 21a. The second and fourth MR elements 12 and 14 are disposed on the inclined surface 22a. In the example shown in FIG. 1, the third and fourth MR elements 13 and 14 are located forward of the first and second MR elements 11 and 12 in the −Y direction, respectively.

As employed herein, a given MR element will be denoted by the reference numeral 110, and a given projection will be denoted by the reference numeral 120. The surface of the projection 120 includes an inclined surface 120a corresponding to the inclined surface 21a or 22a and an inclined surface 120b corresponding to the inclined surface 21b or 22b. As shown in FIG. 3, the MR element 110 is inclined relative to the bottom surface 20b of the support member 20, i.e., the reference plane. The support member 20 is a member for supporting the MR element 110 as inclined relative to the reference plane.

In the present example embodiment, each of the inclined surfaces 120a and 120b is a curved surface. The MR element 110 thus curves along the curved surface (inclined surface 120a). For the sake of convenience, in the present example embodiment, an angle that an imaginary line intersecting the MR element 110 forms with the XY plane will be regarded as an angle that the inclined surface 120a forms with the reference plane. The magnitude of the angle will be denoted by the symbol a. The imaginary line may be parallel to a tangent passing through a point closest to the barycenter of the MR element 110 on the inclined surface 120a when seen in the Z direction. A direction rotated by α from the X direction to the Z direction will be referred to as a U direction. The opposite direction to the U direction will be referred to as a −U direction.

α is an angle greater than 0° and less than 90°. For example, a may be in the range of 10° or more and 45° or less. The magnitude of the angle that the inclined surface 120b forms with the reference plane may be substantially the same as a. In the following description, the magnitude of the angle that the inclined surface 21a forms with the reference plane, the magnitude of the angle that the inclined surface 21b forms with the reference plane, the magnitude of the angle that the inclined surface 22a forms with the reference plane, and the magnitude of the angle that the inclined surface 22b forms with the reference plane are all a.

In FIG. 3, the bottom surface of the MR element 110 is shown to be in contact with the inclined surface 120a. In fact, an electrode for connecting to another MR element 110 or a power supply port, a ground port, a first output port, or a second output port to be described below is disposed between the bottom surface of the MR element 110 and the inclined surface 120a.

Figure 4:
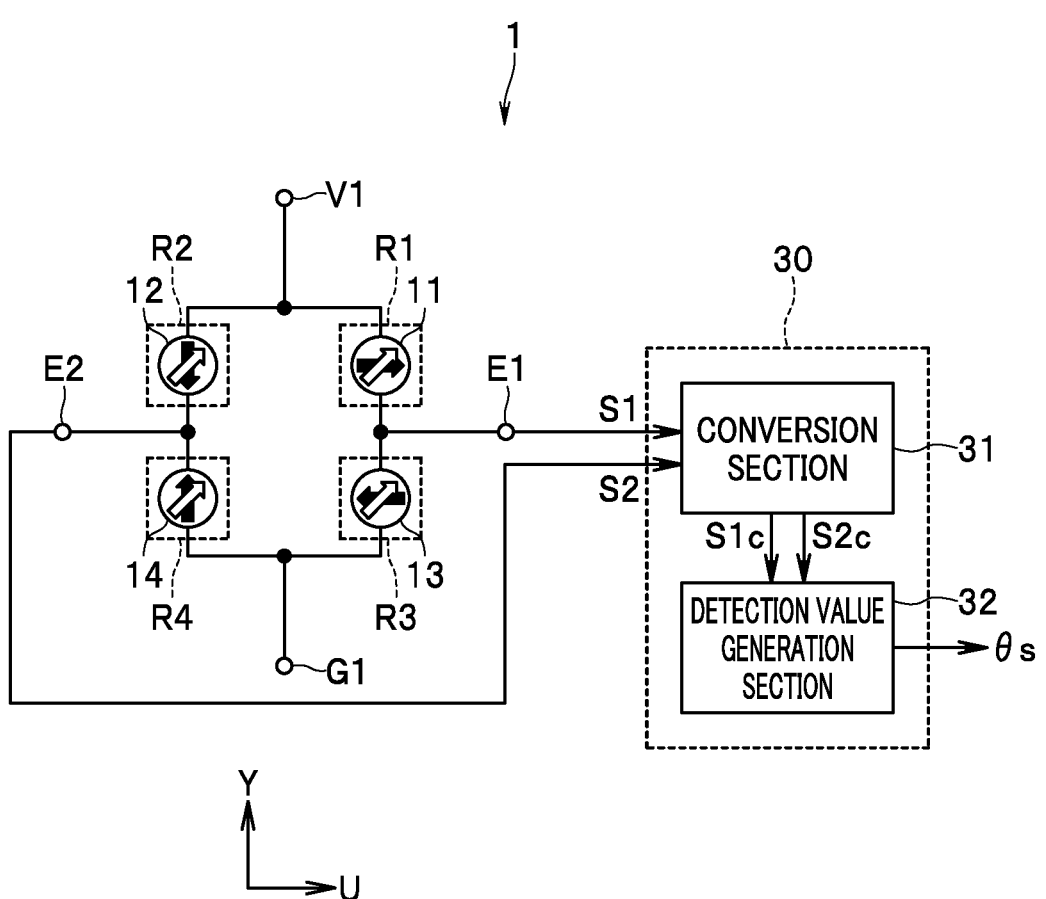
FIG. 4 is a circuit diagram showing a circuit configuration of the magnetic sensor according to the first example embodiment of the technology.

Next, a circuit configuration of the magnetic sensor 1 will be described with reference to FIG. 4. FIG. 4 is a circuit diagram showing the circuit configuration of the magnetic sensor 1. The magnetic sensor 1 further includes a power supply port V1, a ground port G1, a first output port E1, a second output port E2, a first resistor section R1, a second resistor section R2, a third resistor section R3, and a fourth resistor section R4. The first resistor section R1 is provided between the power supply port V1 and the first output port E1. The second resistor section R2 is provided between the power supply port V1 and the second output port E2. The third resistor section R3 is provided between the ground port G1 and the first output port E1. The fourth resistor section R4 is provided between the ground port G1 and the second output port E2.

A voltage or current of predetermined magnitude is applied to the power supply port V1. The ground port G1 is grounded.

The first resistor section R1 includes the first MR element 11. The second resistor section R2 includes the second MR element 12. The third resistor section R3 includes the third MR element 13. The fourth resistor section R4 includes the fourth MR element 14.

In the example shown in FIG. 4, the first resistor section R1 includes the first MR element 11. However, the first resistor section R1 may include a plurality of MR elements connected in series as the first MR element 11. Similarly, the second to fourth resistor sections R2 to R4 may each include a plurality of MR elements connected in series.

The first MR element 11 is configured to detect a target magnetic field MF and generate a first detection signal S1. The third MR element 13 is configured to detect the target magnetic field MF and generate the first detection signal S1 in cooperation with the first MR element 11.

The second MR element 12 is configured to detect the target magnetic field MF and generate a second detection signal S2. The fourth MR element 14 is configured to detect the target magnetic field MF and generate the second detection signal S2 in cooperation with the second MR element 12.

The first detection signal S1 may be a signal leading the second detection signal S2 in phase. The phase difference between the first and second detection signals S1 and S2 is 90°, for example.

The magnetic sensor 1 further includes a processor 30 configured to generate a detection value θs having a correspondence with an angle to be detected. The processor 30 includes an application specific integrated circuit (ASIC) or a microcomputer, for example.

In particular, in the present example embodiment, the processor 30 includes a conversion section 31 that converts the first detection signal S1 and the second detection signal S2 into a first corrected signal S1c and a second corrected signal S2c, respectively. The conversion section 31 may be a functional block constituted by the processor 30. The function of the conversion section 31 will be described in detail below.

The processor 30 further includes a detection value generation section 32 configured to generate the detection value θs using the first and second corrected signals S1c and S2c. The detection value generation section 32 may be a functional block constituted by the processor 30.

Figure 5:
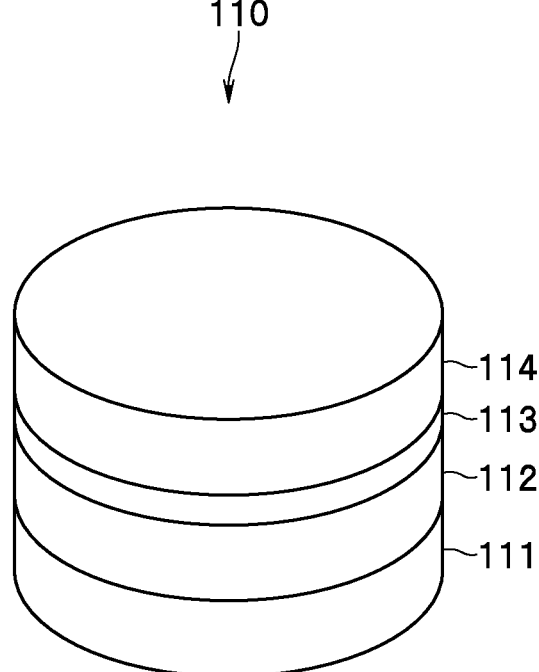
FIG. 5 is a perspective view showing a magnetoresistive element of the first example embodiment of the technology.

Next, the first and second detection signals S1 and S2 will be described. A configuration of the MR element 110 will initially be described with reference to FIG. 5. FIG. 5 is a perspective view showing the MR element 110. The MR element 110 is a spin-valve MR element. The MR element 110 includes a magnetization pinned layer 112 having a first magnetization whose direction is fixed, a free layer 114 having a second magnetization whose direction is variable depending on the direction of the target magnetic field MF, and a gap layer 113 located between the magnetization pinned layer 112 and the free layer 114. The MR element 110 may be a tunneling magnetoresistive (TMR) element or a giant magnetoresistive (GMR) element. In the TMR element, the gap layer 113 is a tunnel barrier layer. In the GMR element, the gap layer 113 is a nonmagnetic conductive layer. The resistance of the MR element 110 changes with the angle that the second magnetization direction of the free layer 114 forms with respect to the first magnetization direction of the magnetization pinned layer 112. The resistance of the MR element 110 is at its minimum value when the foregoing angle is 0°, and at its maximum value when the foregoing angle is 180°.

The MR element 110 further includes an antiferromagnetic layer 111. The antiferromagnetic layer 111, the magnetization pinned layer 112, the gap layer 113, and the free layer 114 are stacked in this order. The antiferromagnetic layer 111 is formed of an antiferromagnetic material, and is in exchange coupling with the magnetization pinned layer 112 to thereby pin the first magnetization direction of the magnetization pinned layer 112. The magnetization pinned layer 112 may be a so-called self-pinned layer (Synthetic Ferri Pinned layer, SFP layer). The self-pinned layer has a stacked ferri structure in which a ferromagnetic layer, a nonmagnetic intermediate layer, and a ferromagnetic layer are stacked, and the two ferromagnetic layers are antiferromagnetically coupled. In a case where the magnetization pinned layer 112 is the self-pinned layer, the antiferromagnetic layer 111 may be omitted.

It should be appreciated that the layers 111 to 114 of each MR element 110 may be stacked in the reverse order to that shown in FIG. 5.

The MR element 110 may have a circular or substantially circular planar shape. The planar shape of the MR element 110 may refer to a shape seen in one direction that is the stacking direction of the layers 111 to 114, or a shape seen in the Z direction.

In FIG. 1, the arrows shown on the MR elements indicate the first magnetization directions of the magnetization pinned layers 112 of the MR elements. In FIG. 4, the solid arrows indicate the first magnetization directions of the magnetization pinned layers 112. In FIG. 4, the hollow arrows indicate the second magnetization directions of the free layers 114.

The first magnetization direction of the magnetization pinned layer 112 of the first MR element 11 and the first magnetization direction of the magnetization pinned layer 112 of the second MR element 12 intersect each other. The first magnetization direction of the magnetization pinned layer 112 of the third MR element 13 and the first magnetization direction of the magnetization pinned layer 112 of the fourth MR element 14 intersect each other. Either one of the first magnetization directions of the magnetization pinned layers 112 of the first and second MR elements 11 and 12 intersects the bottom surface 20b of the support member 20, i.e., the reference plane. Either one of the first magnetization directions of the magnetization pinned layers 112 of the third and fourth MR elements 13 and 14 intersects the bottom surface 20b of the support member 20, i.e., the reference plane.

In the present example embodiment, the first magnetization direction of the magnetization pinned layer 112 of the first MR element 11 is the U direction. The first magnetization direction of the magnetization pinned layer 112 of the second MR element 12 is the −Y direction. The first magnetization direction of the magnetization pinned layer 112 of the third MR element 13 is the −U direction. The first magnetization direction of the magnetization pinned layer 112 of the fourth MR element 14 is the Y direction. The first magnetization directions of the magnetization pinned layers 112 of both the first and third MR elements 11 and 13 therefore intersect the reference plane. The first magnetization directions of the magnetization pinned layers 112 of both the second and fourth MR elements 12 and 14 are parallel to the reference plane.

The first and third MR elements 11 and 13 are configured so that the potential at the first output port E1 is generated as the first detection signal S1. More specifically, as changes occur to the direction and strength of a magnetic field component applied to the first and third MR elements 11 and 13 in a direction parallel to the U direction, the resistance of each of the first and third resistor sections R1 and R3 changes so that the resistance of the first resistor section R1 increases and the resistance of the third resistor section R3 decreases, or so that the resistance of the first resistor section R1 decreases and the resistance of the third resistor section R3 increases. As a result, the potential at the first output port E1 changes. The magnetic sensor 1 generates a signal corresponding to the potential at the first output port E1 as the first detection signal S1.

The second and fourth MR elements 12 and 14 are configured so that the potential at the second output port E2 is generated as the second detection signal S2. More specifically, as changes occur to the direction and strength of a magnetic field component applied to the second and fourth MR elements 12 and 14 in the direction parallel to the Y direction, the resistance of each of the second and fourth MR elements 12 and 14 changes so that the resistance of the second resistor section R2 increases and the resistance of the fourth resistor section R4 decreases, or so that the resistance of the second resistor section R2 decreases and the resistance of the fourth resistor section R4 increases. As a result, the potential at the second output port E2 changes. The magnetic sensor 1 generates a signal corresponding to the potential at the second output port E2 as the second detection signal S2.

In view of the production accuracy of the first to fourth MR elements 11 to 14 and other factors, the first magnetization directions of the magnetization pinned layers 112 may be slightly different from the foregoing directions. The first magnetizations of the magnetization pinned layers 112 may be configured to include magnetization components having the foregoing directions as their main components. In such a case, the first magnetization directions of the magnetization pinned layers 112 are the same or substantially the same as the foregoing directions.

Figure 6:
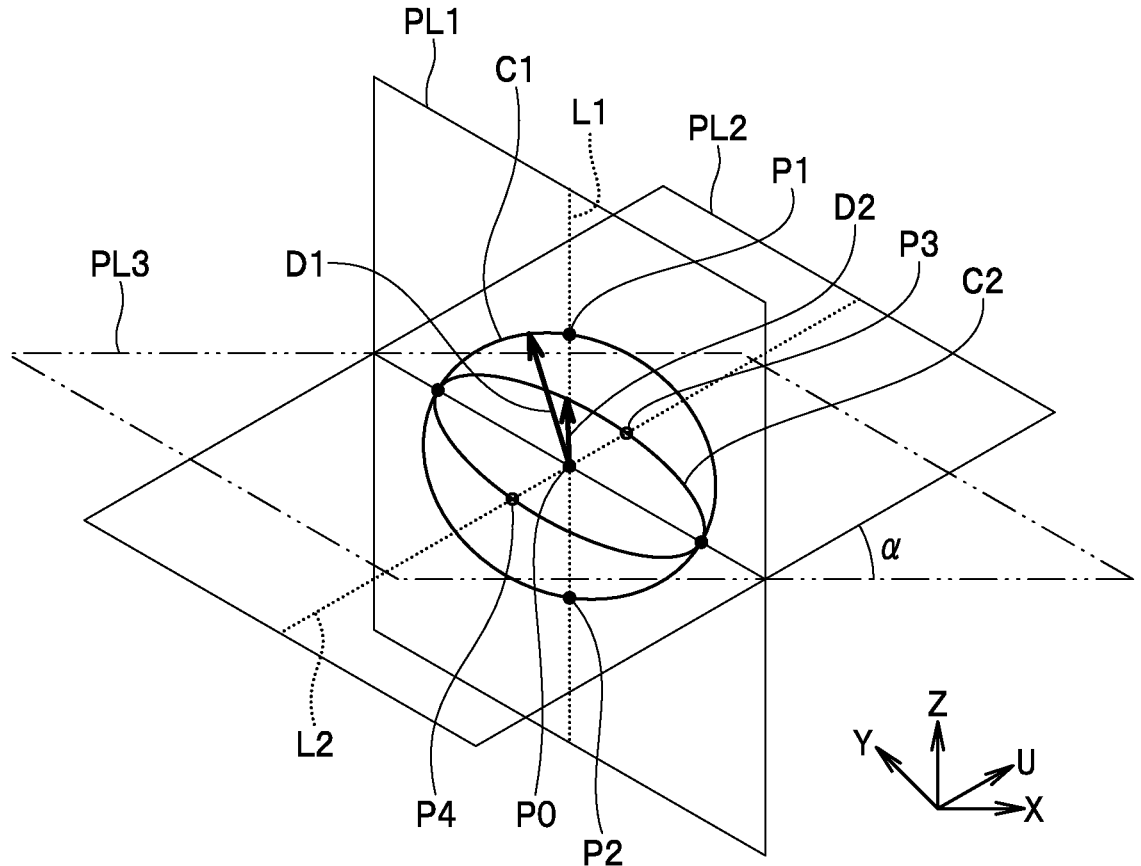
FIG. 6 is an explanatory diagram for describing a target magnetic field of the first example embodiment of the technology.
Figure 7:
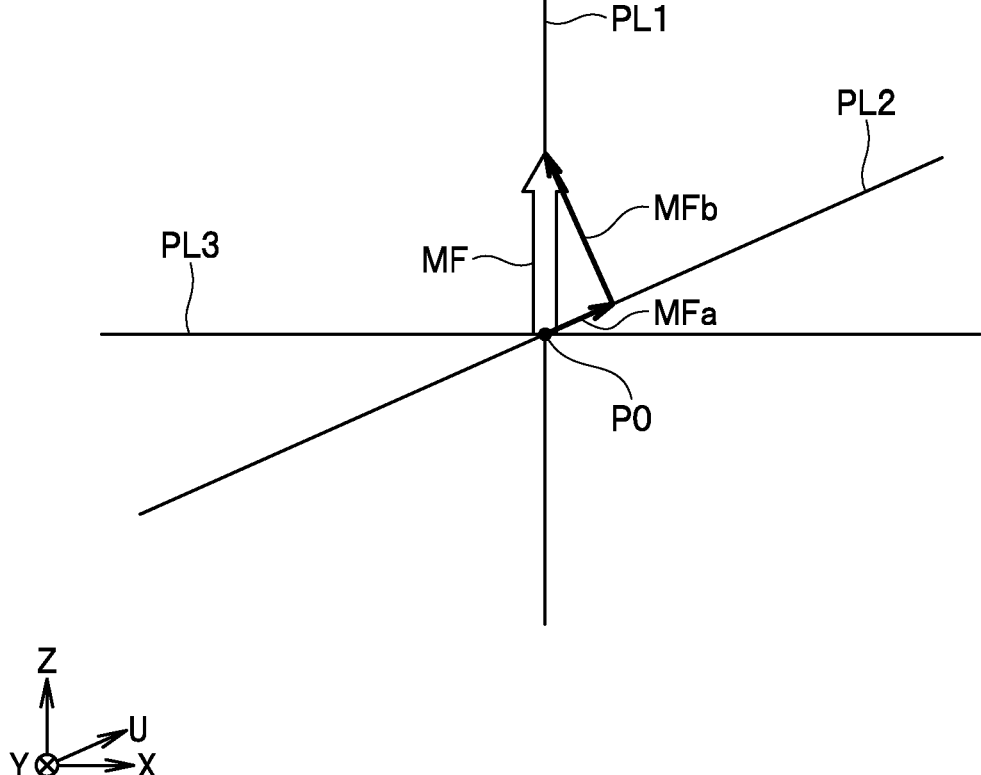
FIG. 7 is an explanatory diagram showing an in-plane component and a perpendicular component of the target magnetic field of the first example embodiment of the technology.

Next, the target magnetic field MF will be described with reference to FIGS. 6 and 7. FIG. 6 is an explanatory diagram for describing the target magnetic field MF. FIG. 7 is an explanatory diagram showing an in-plane component and a perpendicular component of the target magnetic field MF.

In FIGS. 6 and 7, a plane denoted by the symbol PL1 represents a YZ plane intersecting a reference position P0. This plane will hereinafter be referred to as a first plane PL1. The reference position P0 is located inside or at the surface of the magnetic sensor 1. A plane denoted by the symbol PL2 represents a plane intersecting the reference position P0 and the first plane PL1. This plane will hereinafter be referred to as a second plane PL2. A plane denoted by the symbol PL3 represents an XY plane intersecting the reference position P0. This plane will hereinafter be referred to as a third plane PL3.

The target magnetic field MF has a first direction D1 at a reference position P0. The first direction D1 changes within the first plane PL1. In FIG. 6, the arrow denoted by the symbol D1 represents the first direction D1 and the strength of the target magnetic field MF at the reference position P0. The end of the arrow denoted by the symbol D1 moves along a circle denoted by the symbol C1.

The second plane PL2 is inclined relative to both the first plane PL1 and the third plane PL3, and intersects the third plane PL3 at a dihedral angle. The magnitude of the dihedral angle is the same as the magnitude of the angle that the inclined surface 120a shown in FIG. 3 forms with the reference plane. Note that the second plane PL2 shown in FIGS. 6 and 7 is just an example.

As shown in FIG. 7, the target magnetic field MF at the reference position P0 can be divided into an in-plane component MFa parallel to the second plane PL2 and a perpendicular component MFb perpendicular to the second plane PL2. FIG. 7 shows a state where the first direction D1 that is the direction of the target magnetic field MF at the reference position P0 coincides with the Z direction. The in-plane component MFa has a second direction D2 that changes with a change in the first direction D1. In FIG. 6, the arrow denoted by the symbol D2 represents the second direction D2 and the strength of the in-plane component MFa. The end of the arrow denoted by the symbol D2 moves along an ellipse denoted by the symbol C2.

FIG. 6 shows a virtual line L1, a virtual line L2, and intersections P1, P2, P3, and P4. The virtual line L1 passes the reference position P0 and is parallel to the Z direction. The virtual line L2 passes the reference position P0 and is parallel to the U direction. The intersections P1 and P2 are those of the virtual line L1 and the circle C1. The intersections P3 and P4 are those of the virtual line L2 and the ellipse C2. The virtual line L2, the ellipse C2, the intersections P3 and P4, and the second direction D2 are orthogonal projections of the virtual line L1, the circle C1, the intersections P1 and P2, and the first direction D1 upon the second plane PL2, respectively.

In the present example embodiment, the second plane PL2 is defined for each of the first to fourth MR elements 11 to 14. The second plane PL2 intersects the corresponding MR element.

Like the target magnetic field MF at the reference position P0, the target magnetic field MF received by each of the first to fourth MR elements 11 to 14 can be divided into an in-plane component parallel to the second plane PL2 and a perpendicular component MFb perpendicular to the second plane PL2. In FIG. 3, the in-plane component of the target magnetic field MF received by the MR element 110 is represented by an arrow denoted by the symbol MFa. Like the in-plane component MFa shown in FIG. 7, the in-plane component of the target magnetic field MF received by each of the first to fourth MR elements 11 to 14 has a second direction that changes depending on the first direction D1. The second magnetization direction of the free layer 114 in each of the first to fourth MR elements 11 to 14 changes with a change in the second direction. The first detection signal S1, the second detection signal S2, and the detection value θs all depend on the second magnetization direction.

Since the second direction changes with a change in the first direction D1, the second magnetization direction changes with a change in the first direction D1. The first detection signal S1, the second detection signal S2, and the detection value θs therefore all correspond to the first direction D1.

The first to fourth MR elements 11 to 14 are disposed within an area where changes in the direction of the target magnetic field MF, due to the position at which the target magnetic field MF is received, do not occur substantially. The directions of the target magnetic field MF received by the first to fourth MR elements 11 to 14 are therefore substantially the same.

Figure 8:
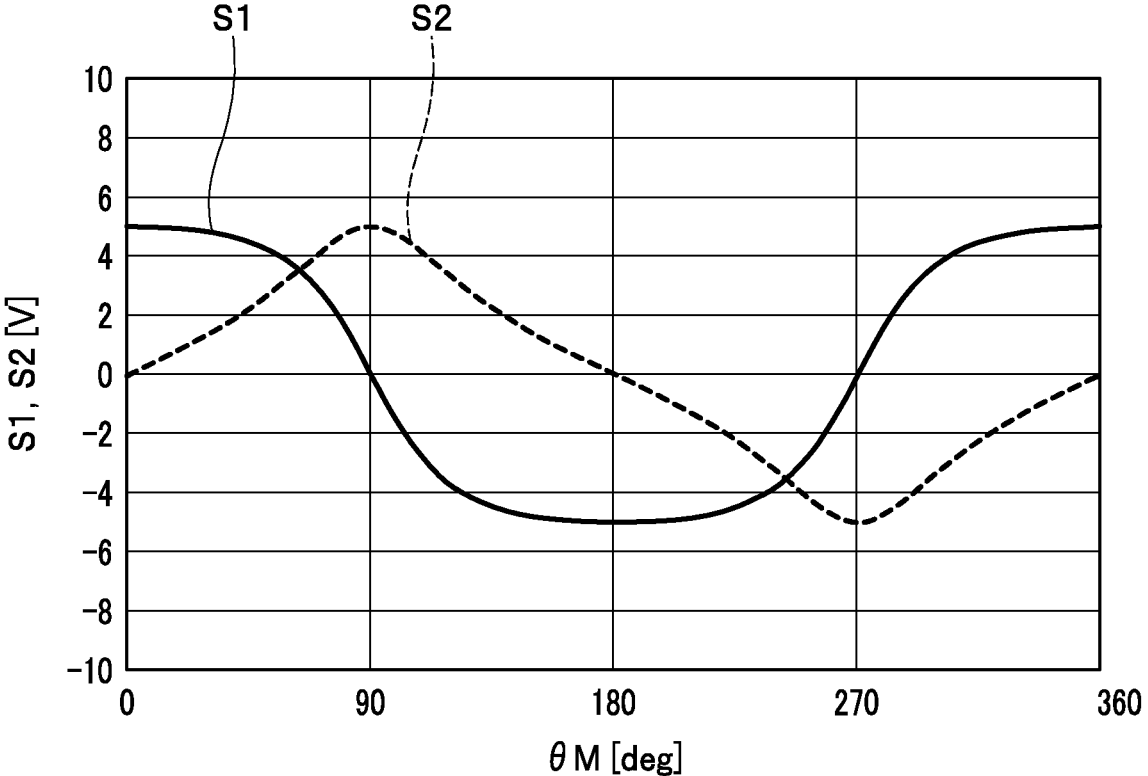
FIG. 8 is a waveform chart showing first and second detection signals according to the first example embodiment of the technology.

Next, an operation of the conversion section 31 of the processor 30 will be described. FIG. 8 is a waveform chart showing the first and second detection signals S1 and S2. In FIG. 8, the horizontal axis indicates an angle θM (hereinafter, referred to as a magnetic field angle θM) that the first direction D1 of the target magnetic field MF forms with a predetermined reference direction (for example, Z direction). The vertical axis indicates the value of each of the first and second detection signals S1 and S2. As shown in FIG. 8, if the first direction D1 changes with a predetermined period, the waveform of each of the first and second detection signals S1 and S2 is distorted from an ideal sinusoidal curve.

The conversion section 31 is configured to change the amplitude of at least either one of the first and second detection signals S1 and S2 to make the ratio of the amplitude of the second corrected signal S2c to the amplitude of the first corrected signal S1c different from the ratio of the amplitude of the second detection signal S2 to the amplitude of the first detection signal S1.

Figure 9:
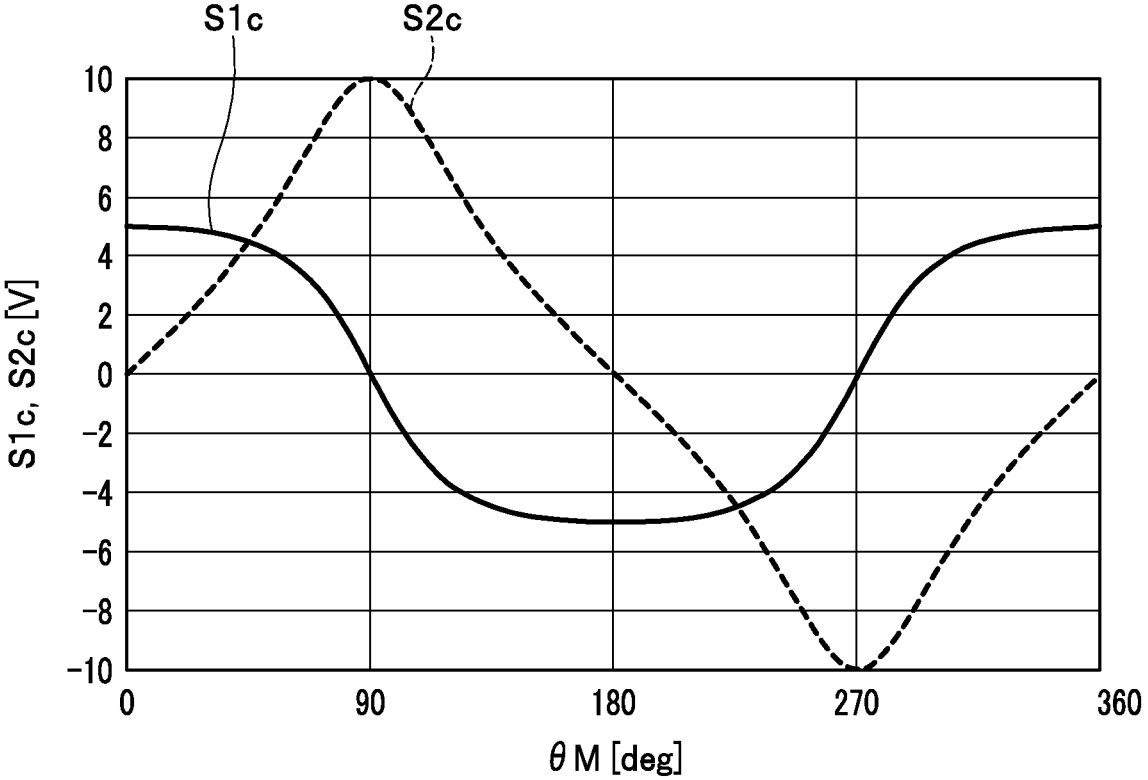
FIG. 9 is a waveform chart showing first and second corrected signals of a first example.

FIG. 9 is a waveform chart showing the first and second corrected signals S1c and S2c according to a first example. In FIG. 9, the horizontal axis indicates the magnetic field angle θM, and the vertical axis indicates the value of each of the first and second corrected signals S1c and S2c. In the first example, the amplitude of the second detection signal S2 is changed so that the second corrected signal S2c has an amplitude greater than that of the unconverted second detection signal S2. The ratio of the amplitude of the second corrected signal S2c to the amplitude of the first corrected signal S1c is thereby made different from the ratio of the amplitude of the second detection signal S2 to the amplitude of the first detection signal S1.

Figure 10:
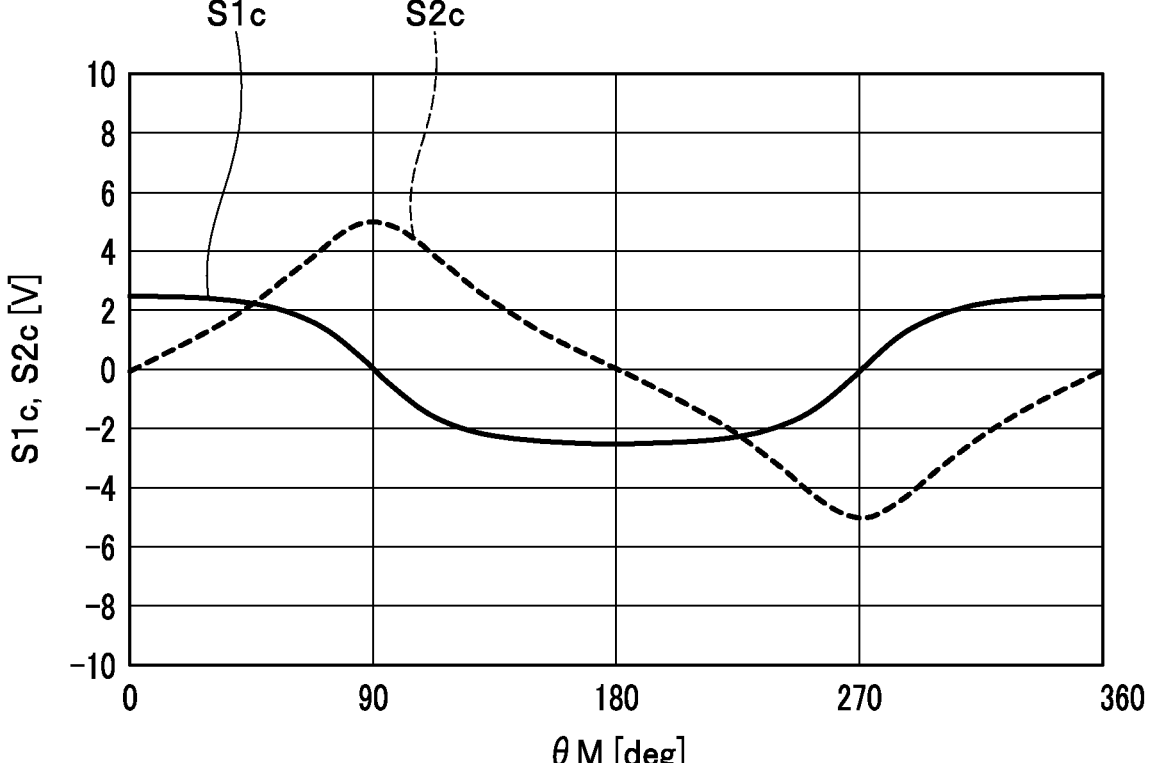
FIG. 10 is a waveform chart showing first and second corrected signals of a second example.

FIG. 10 is a waveform chart showing the first and second corrected signals S1c and S2c according to a second example. In FIG. 10, the horizontal axis indicates the magnetic field angle θM, and the vertical axis indicates the value of each of the first and second corrected signals S1c and S2c. In the second example, the amplitude of the first detection signal S1 is changed so that the first corrected signal S1c has an amplitude smaller than that of the unconverted first detection signal S1. The ratio of the amplitude of the second corrected signal S2c to the amplitude of the first corrected signal S1c is thereby made different from the ratio of the amplitude of the second detection signal S2 to the amplitude of the first detection signal S1.

The ratio of the amplitude of the second corrected signal S2c to the amplitude of the first corrected signal S1c will hereinafter be referred to as a post-conversion amplitude ratio. The ratio of the amplitude of the second detection signal S2 to the amplitude of the first detection signal S1 will be referred to as a pre-conversion amplitude ratio. In both the first and second examples, the pre-conversion amplitude ratio is 1, and the post-conversion amplitude ratio is 2.

The conversion section 31 may be configured so that the post-conversion amplitude ratio is a value other than 1. In particular, in the example embodiment, the conversion section 31 may be configured so that the post-conversion amplitude ratio does not fall within a range of 1 or less. The desirable range of the post-conversion amplitude ratio will be described in detail below.

The conversion section 31 may be configured to perform processing for correcting the phase and offset of each of the first and second detection signals S1 and S2 in addition to the processing for making the post-conversion amplitude ratio different from the pre-conversion amplitude ratio.

Next, an operation of the detection value generation section 32 of the processor 30 will be described. The detection value generation section 32 calculates the detection value θs in the range of 0° or more and not more than 360°, for example, by the following Eq. (1):

$$\theta s = a\tan(S2c/S1c). \qquad (1)$$

"a tan" represents the arctangent.

Next, the operation and effects of the magnetic sensor 1 according to the example embodiment will be described. In the example embodiment, the conversion section 31 makes the ratio of the amplitude of the second corrected signal S2c to the amplitude of the first corrected signal S1c different from the ratio of the amplitude of the second detection signal S2 to the amplitude of the first detection signal S1. According to the example embodiment, an error in the detection value θs can thereby be reduced. This effect will now be described in detail.

Figure 11:
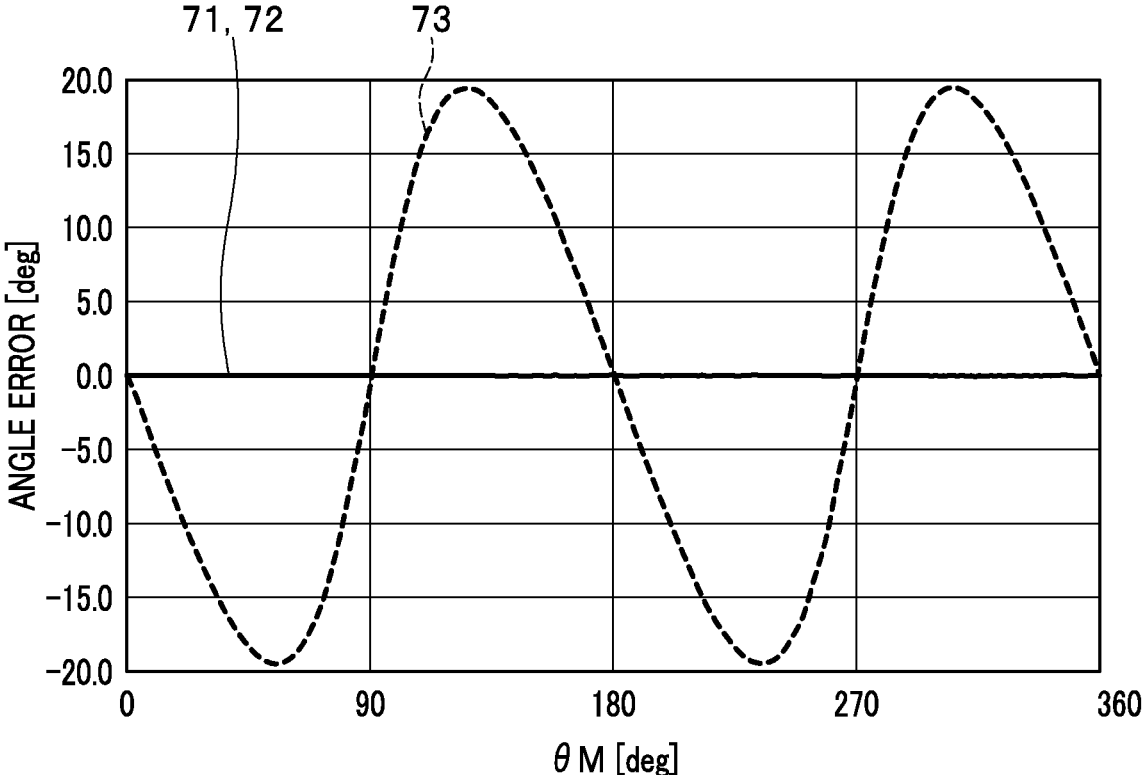
FIG. 11 is a characteristic chart showing angle errors of the first example, the second example, and a comparative example.

FIG. 11 is a characteristic chart showing angle errors of the first example, the second example, and a comparative example. In FIG. 11, the horizontal axis indicates the magnetic field angle θM, and the vertical axis indicates the angle error. In FIG. 11, the curve denoted by the reference numeral 71 represents the angle error of the first example. The curve denoted by the reference numeral 72 represents the angle error of the second example. The curve denoted by the reference numeral 73 represents the angle error of the comparative example. In FIG. 11, the angle error 71 of the first example and the angle error 72 of the second example are almost the same.

The angle error 71 of the first example is a difference between the detection value θs, which is determined using the first and second corrected signals S1c and S2c of the first example shown in FIG. 9, and the magnetic field angle θM. The angle error 72 of the second example is a difference between the detection value θs, which is determined using the first and second corrected signals S1 and S2 of the second example shown in FIG. 10, and the magnetic field angle θM. The angle error 73 of the comparative example is a difference between a detection value θs determined by substituting the first and second detection signals S1 and S2 shown in FIG. 8 into Eq. (1) in place of the first and second corrected signals S1c and S2c and the magnetic field angle θM. The angle error 73 of the comparative example can be said to be an angle error in a case without the conversion section 31.

As shown in FIG. 11, according to the example embodiment, an error in the detection value θs can be reduced by the use of the first and second corrected signals S1c and S2c like those of the first example or the second example.

Next, a result of a simulation to examine the desirable range of the amplitude ratio will be described. In the simulation, the magnitude a of the angle that each of the inclined surfaces 21a, 21b, 22a, and 22b forms with the reference plane was changed, in increments of 5°, while staying within the range of 10° to 45°. At each magnitude a, the error (angle error) in the detection value θs was determined while changing the post-conversion amplitude ratio. In the simulation, the peak-to-peak value of the angle error when the magnetic field angle θM was changed was determined as the angle error.

Figure 12:
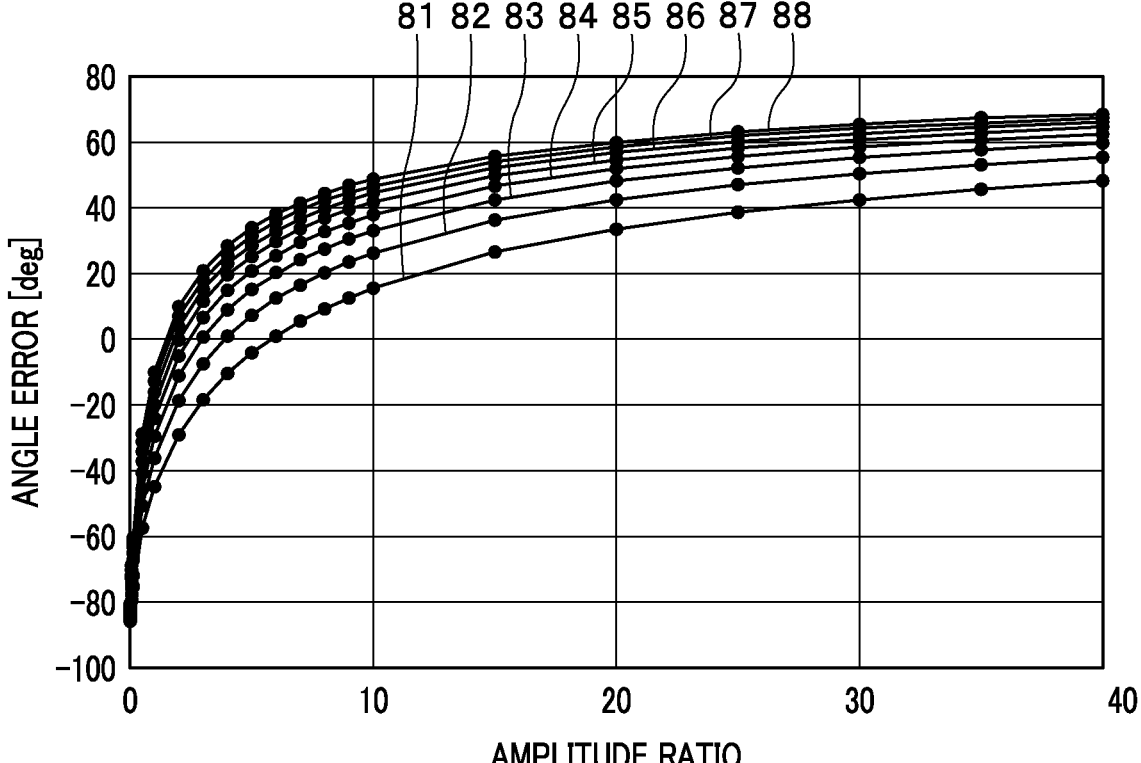
FIG. 12 is a characteristic chart showing a relationship between an amplitude ratio and an angle error.

FIG. 12 is a characteristic chart showing a relationship between the post-conversion amplitude ratio and the angle error. In FIG. 12, the horizontal axis indicates the post-conversion amplitude ratio, and the vertical axis indicates the angle error. In FIG. 12, the angle error at α=10° is represented by a plurality of points connected by the line denoted by the reference numeral 81. The angle error at α=15° is represented by a plurality of points connected by the line denoted by the reference numeral 82. The angle error at α=20° is represented by a plurality of points connected by the line denoted by the reference numeral 83. The angle error at α=25° is represented by a plurality of points connected by the line denoted by the reference numeral 84. The angle error at α=30° is represented by a plurality of points connected by the line denoted by the reference numeral 85. The angle error at α=35° is represented by a plurality of points connected by the line denoted by the reference numeral 86. The angle error at α=40° is represented by a plurality of points connected by the line denoted by the reference numeral 87. The angle error at α=45° is represented by a plurality of points connected by the line denoted by the reference numeral 88.

As shown in FIG. 12, it can be seen that there is an amplitude ratio where the angle error is zero, regardless of the value of α. In view of reducing the angle error, the values of α and the post-conversion amplitude ratio are desirably selected so that the angle error is zero or near zero. Meanwhile, in view of the production accuracy of the MR element 110, α desirably falls within the range of 10° to 45°. It is therefore desirable to select the value of the post-conversion amplitude ratio so that the angle error is zero or near zero with α in the range of 10° to 45°.

Figure 13:
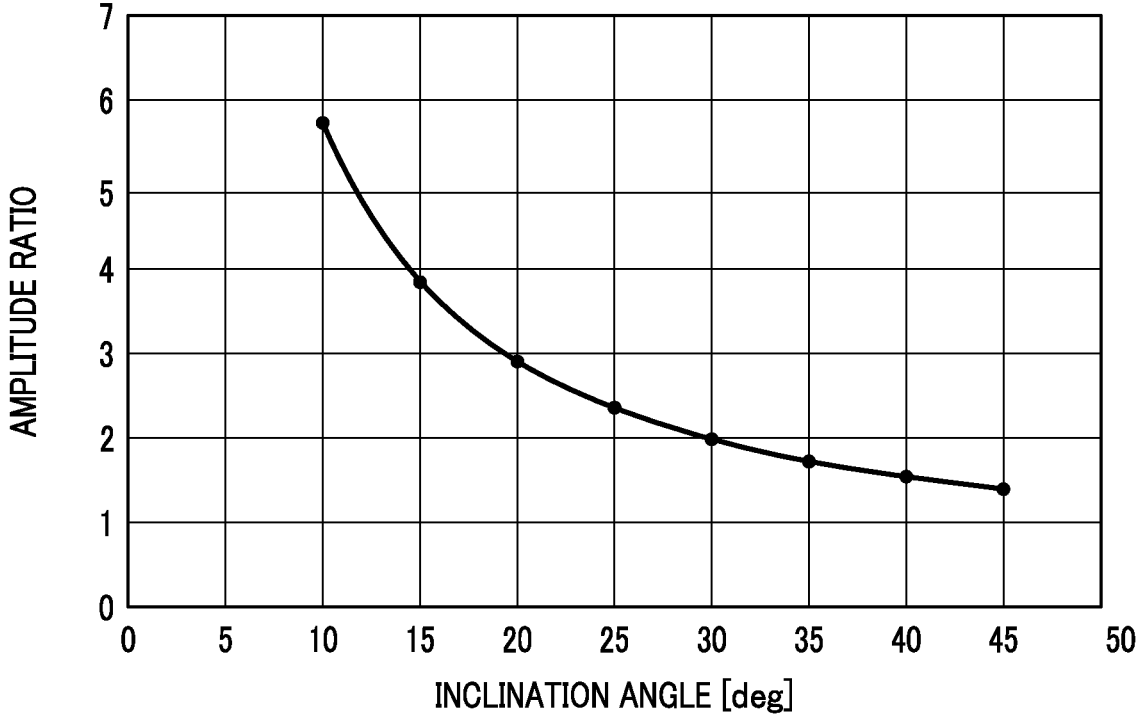
FIG. 13 is a characteristic chart showing a relationship between an inclination angle and the amplitude ratio where the angle error is zero.

FIG. 13 is a characteristic chart showing a relationship between the inclination angle and the amplitude ratio where the angle error is zero. In FIG. 13, the horizontal axis indicates the inclination angle α of the inclined surfaces 21*a*, 21*b*, 22*a*, and 22*b*. The vertical axis indicates the post-conversion amplitude ratio. It can be seen from FIG. 13 that if a is in the range of 10° to 45°, the post-conversion amplitude ratio desirably does not fall within the range of 1 or less.

FIG. 13 also shows a curve connecting the plurality of points representing the respective post-conversion amplitude ratios. This curve can be expressed by a function 1/sin (α) with α as a variable. In other words, the post-conversion amplitude ratio where the angle error is zero can be calculated using a and the function 1/sin (α).

The angle error is desirably 1° or less, for example. If α is 10°, the post-conversion amplitude ratio at which the angle error is 1° or less is 5.76±0.20. If α is 30°, the post-conversion amplitude ratio at which the angle error is 1° or less is 2.00±0.06. If α is 45°, the post-conversion amplitude ratio at which the angle error is 1° or less is 1.41±0.05. The angle error can be reduced to a predetermined value or less by adjusting the post-conversion amplitude ratio depending on a.

Figure 14:
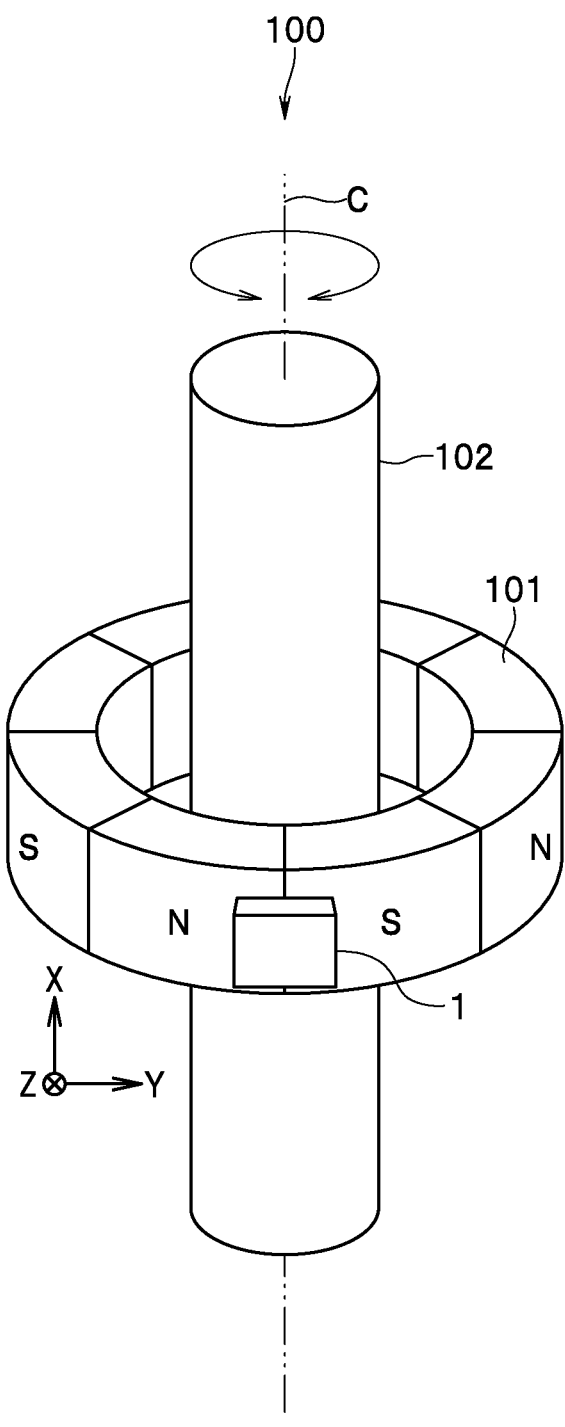
FIG. 14 is a perspective view showing a magnetic sensor system according to the first example embodiment of the technology.

Next, a magnetic sensor system 100 according to the example embodiment will be described with reference to FIG. 14. FIG. 14 is a perspective view showing the magnetic sensor system 100. The magnetic sensor system 100 includes the magnetic sensor 1 and a magnetic field generator 101 that generates the target magnetic field MF. In the example shown in FIG. 14, the magnetic field generator 101 is a magnet including one or more pairs of N and S poles arranged alternately in a ring-like configuration. The magnetic sensor 1 is opposed to the outer periphery of the magnetic field generator 101.

The magnetic field generator 101 is configured to rotate about a rotation axis C. In the example shown in FIG. 14, for example, the magnetic field generator 101 is fixed to a shaft 102 that rotates about the rotation shaft C by a not-shown fixing member that is disposed inside the magnetic field generator 101. For example, the shaft 102 may be the shaft of a not-shown motor or a shaft configured to rotate with the motor shaft. The magnetic field generator 101 and the shaft 102 are configured to rotate integrally.

The magnetic sensor 1 and the magnetic field generator 101 are configured so that the direction of the target magnetic field MF at a predetermined position (first direction D1) rotates as the position of the magnetic field generator 101 relative to the magnetic sensor 1 changes. In particular, in the present example embodiment, the predetermined position refers to a position where the magnetic sensor 1 is located. As the magnetic field generator 101 rotates about the rotation axis C, the rotation position of the magnetic field generator 101 relative to the magnetic sensor 1 changes and, as a result, the direction of the target magnetic field MF rotates.

In the magnetic sensor system 100, the X, Y, and Z directions are defined about the position where the magnetic sensor 1 is located. The Y direction may be a direction parallel to a tangent to the magnetic field generator 101. The Z direction may be a direction from the magnetic sensor 1 to the rotation axis.

Second Example Embodiment

Figure 15:
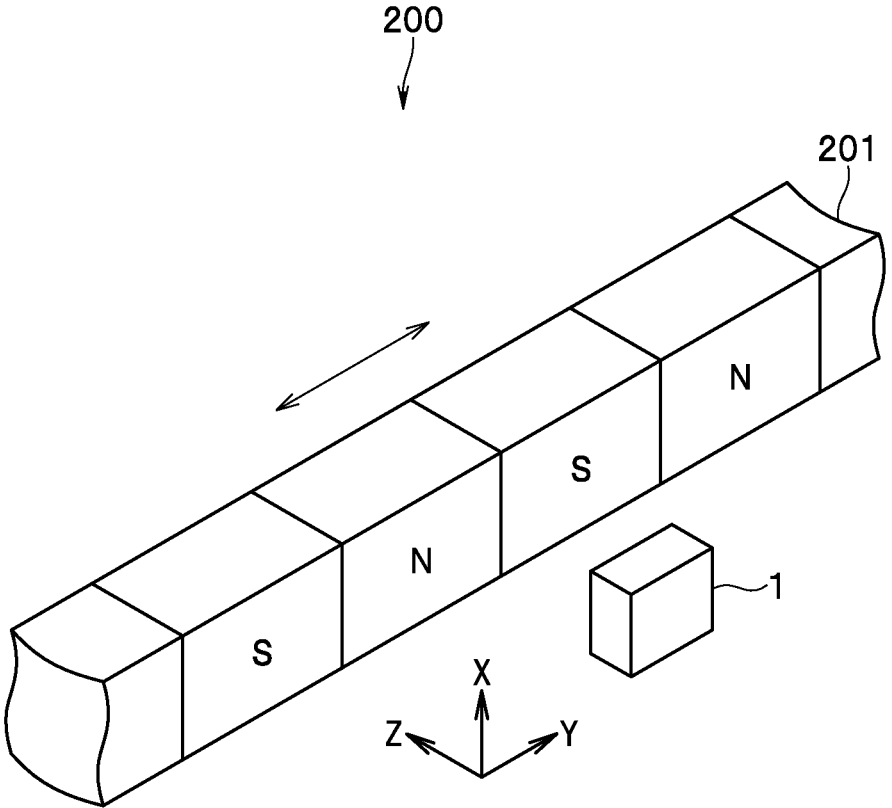
FIG. 15 is a perspective view showing a magnetic sensor system according to a second example embodiment of the technology.

Next, a magnetic sensor system 200 according to a second example embodiment of the technology will be described with reference to FIG. 15. FIG. 15 is a perspective view showing the magnetic sensor system 200. The magnetic sensor system 200 includes the magnetic sensor 1 according to the first example embodiment and a magnetic field generator 201 that generates the target magnetic field MF. In the example shown in FIG. 15, the magnetic field generator 201 is a linear scale including a plurality of pairs of N and S poles arranged in a linear configuration. The magnetic sensor 1 is opposed to the outer periphery of the magnetic field generator 201.

The magnetic sensor 1 and the magnetic field generator 201 are configured so that the direction of the target magnetic field MF at a predetermined position (first direction D1) rotates as the position of the magnetic field generator 201 relative to the magnetic sensor 1 changes. In particular, in the present example embodiment, the predetermined position refers to a position where the magnetic sensor 1 is located. As a not-shown moving body moves, either the magnetic sensor 1 or the magnetic field generator 201 moves in response in a direction parallel to the direction in which the plurality of pairs of N and S poles are arranged. This changes the position of the magnetic field generator 201 relative to the magnetic sensor 1 and, as a result, the direction of the target magnetic field MF rotates.

In the magnetic sensor system 200, the X, Y, and Z directions are defined about the position where the magnetic sensor 1 is located. The Y direction may be a direction parallel to the direction in which the plurality of pairs of N and S poles are arranged. The Z direction may be the direction from the magnetic sensor 1 to the magnetic field generator 201.

The configuration, operation and effects of the present example embodiment are otherwise the same as those of the first example embodiment.

Third Example Embodiment

Figure 16:
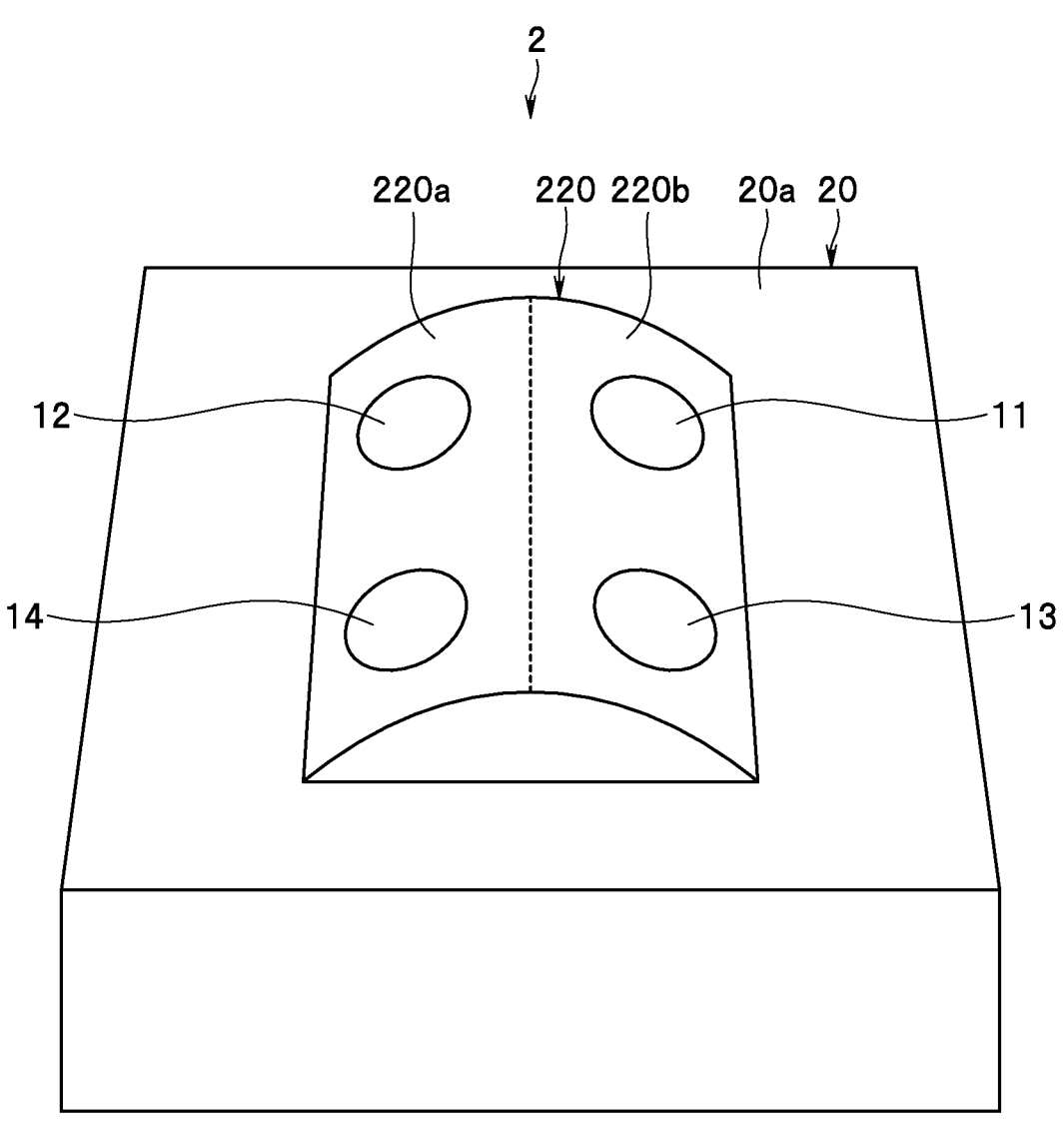
FIG. 16 is a perspective view showing a magnetic sensor according to a third example embodiment of the technology.

Next, a magnetic sensor 2 according to a third example embodiment of the technology will be described with reference to FIG. 16. FIG. 16 is a perspective view showing the magnetic sensor 2.

In the example embodiment, the support member 20 includes a projection 220 projecting in the Z direction from the top surface 20*a* of the support member 20 in place of the projections 21 and 22 of the first example embodiment. The projection 220 has a shape similar to that of the projection 21 or 22.

The surface of the projection 220 includes an inclined surface 220*a* and an inclined surface 220*b*. The inclined surface 220*a* refers to the surface of the projection 220 on the left of the top end of the projection 220 in FIG. 16. The inclined surface 220*b* refers to the surface of the projection 220 on the right of the top end of the projection 220 in FIG. 16. FIG. 16 shows the top end of the projection 220, i.e., the border between the inclined surfaces 220*a* and 220*b* in a dotted line. The inclined surfaces 220*a* and 220*b* may have a shape symmetrical or near symmetrical about a plane intersecting the top end of the projection 220.

The first to fourth MR elements 11 to 14 of the magnetic sensor 2 are disposed on the single projection 220. The first and third MR elements 11 and 13 are disposed on the inclined surface 220*b*. The second and fourth MR elements 12 and 14 are disposed on the inclined surface 220*a*. The definitions of an angle that the inclined surface 220*a* forms with the reference plane and an angle that the inclined surface 220*b* forms with the reference plane are the same as that of the angle that the inclined surface 120a forms with the reference plane, described in the first example embodiment.

In other respects, the configuration of the magnetic sensor 2 is the same as that of the magnetic sensor 1 according to the first example embodiment. The configuration, operation and effects of the present example embodiment are otherwise the same as those of the first example embodiment.

Fourth Example Embodiment

Figure 17:
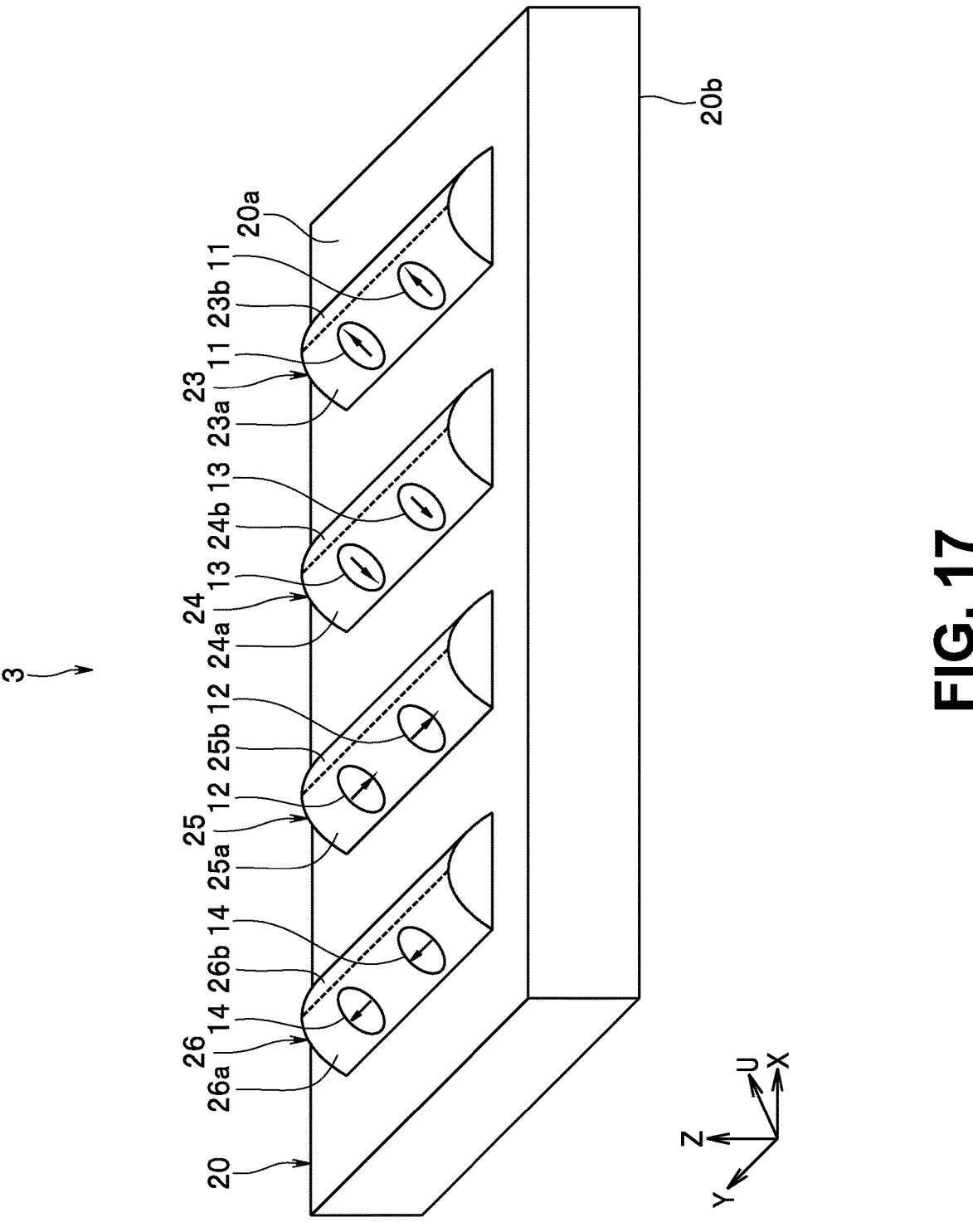
FIG. 17 is a perspective view showing a magnetic sensor according to a fourth example embodiment of the technology.

Next, a magnetic sensor 3 according to a fourth example embodiment of the technology will be described with reference to FIG. 17. FIG. 17 is a perspective view showing the magnetic sensor 3.

In the present example embodiment, the support member 20 includes projections 23, 24, 25, and 26 arranged in a direction parallel to the X direction on the top surface 20a of the support member 20 in place of the projections 21 and 22 of the first example embodiment. Each of the projections 23 to 26 projects in the Z direction from the top surface 20a of the support member 20. Each of the projections 23 to 26 has the same shape as that of the projection 21 or 22.

The surface of the projection 23 includes an inclined surface 23a and an inclined surface 23b. The inclined surface 23a refers to the surface of the projection 23 on the −X direction side of the top end of the projection 23. The inclined surface 23b refers to the surface of the projection 23 on the X direction side of the top end of the projection 23. In FIG. 17, the top end of the projection 23, i.e., the border between the inclined surfaces 23a and 23b is shown in a dotted line. The inclined surfaces 23a and 23b may have a shape symmetrical or near symmetrical about a YZ plane intersecting the top end of the projection 23.

The foregoing description of the surface of the projection 23 also applies to the projections 24 to 26. A description of the surface of the projection 24 is given by replacing the projection 23 and the inclined surfaces 23a and 23b in the foregoing description of the surface of the projection 23 with the projection 24 and inclined surfaces 24a and 24b, respectively. A description of the surface of the projection 25 is given by replacing the projection 23 and the inclined surfaces 23a and 23b in the foregoing description of the surface of the projection 23 with the projection 25 and inclined surfaces 25a and 25b, respectively. A description of the surface of the projection 26 is given by replacing the projection 23 and the inclined surfaces 23a and 23b in the foregoing description of the surface of the projection 23 with the projection 26 and inclined surfaces 26a and 26b, respectively.

The definitions of an angle that the inclined surface 23a forms with the reference plane, an angle that the inclined surface 24a forms with the reference plane, an angle that the inclined surface 25a forms with the reference plane, and an angle that the inclined surface 26a forms with the reference plane are the same as the definition of the angle that the inclined surface 120a forms with the reference plane, described in the first example embodiment.

The magnetic sensor 3 according to the example embodiment includes a plurality of first MR elements 11, a plurality of second MR elements 12, a plurality of third MR elements 13, and a plurality of fourth MR elements 14. The plurality of first MR elements 11 are disposed on the inclined surface 23a. The plurality of second MR elements 12 are disposed on the inclined surface 24a. The plurality of third MR elements 13 are disposed on the inclined surface 25a. The plurality of fourth MR elements 14 are disposed on the inclined surface 26a.

Each of the plurality of first MR elements 11 has the same configuration as that of the first MR element 11 of the first example embodiment. Each of the plurality of second MR elements 12 has the same configuration as that of the second MR element 12 of the first example embodiment. Each of the plurality of third MR elements 13 has the same configuration as that of the third MR element 13 of the first example embodiment. Each of the plurality of fourth MR elements 14 has the same configuration as that of the fourth MR element 14 of the first example embodiment.

Like the magnetic sensor 1 according to the first example embodiment, the magnetic sensor 3 includes first to fourth resistor sections R1 to R4. The relationship of the first to fourth resistor sections R1 to R4 with the plurality of first MR elements 11, the plurality of second MR elements 12, the plurality of third MR elements 13, and the plurality of fourth MR elements 14 is the same as the relationship of the first to fourth resistor sections R1 to R4 with the first to fourth MR elements 11 to 14 of the first example embodiment. In particular, in the present example embodiment, the plurality of first MR elements 11 may be connected in series. The plurality of second MR elements 12 may be connected in series. The plurality of third MR elements 13 may be connected in series. The plurality of fourth MR elements 14 may be connected in series.

In other respects, the configuration of the magnetic sensor 3 is the same as that of the magnetic sensor 1 according to the first example embodiment. The configuration, operation, and effects of the example embodiment are otherwise the same as those of the first example embodiment.

The technology is not limited to the foregoing example embodiments, and various modifications can be made. For example, the first to fourth MR elements 11 to 14 may be disposed on an inclined surface. Alternatively, the first and second MR elements 11 and 12 may be disposed on an inclined surface or a projection. The third and fourth MR elements 13 and 14 may be disposed on an inclined surface or a projection.

The conversion section according to the technology may include resistors electrically connected to the MR elements. The resistors may be included in the first to fourth resistor sections R1 to R4. The resistors may be included in the paths connecting the first and second output ports E1 and E2 to the processor 30.

The inclined surfaces at the surfaces of the projections may include flat surface portions. Alternatively, the surfaces of the projections may have a triangular roof-like shape.

The support member 20 may include a plurality of grooves arranged in the direction parallel to the X direction in the top surface 20a of the support member 20 in place of the plurality of projections. Each of the plurality of grooves is recessed in the −Z direction from the top surface 20a of the support member 20. Each of the plurality of grooves extends in the direction parallel to the Y direction, and the surface of each of the plurality of grooves also extends in the direction parallel to the Y direction. Each of the plurality of grooves may have a shape symmetrical or near symmetrical about a YZ plane. Each of the plurality of grooves may be U-shaped or V-shaped at least in part. The surface of the U-shaped groove includes a semi-cylindrical curved surface. The surface of the V-shaped groove includes two flat surface portions.

The surface of each of the grooves includes a first inclined surface and a second inclined surface. The first inclined surface refers to the surface of the groove on the −X direction side of the bottom end of the groove. The second inclined surface refers to the surface of the groove on the X direction side of the bottom end of the groove. Each of the first and second inclined surfaces corresponds to "at least one inclined surface" of the technology. The description of "at least one inclined surface" of the technology applies to both the first inclined surface and the second inclined surface. Each of the plurality of MR elements is disposed on the first inclined surface or the second inclined surface.

The MR elements are not limited to the circular planar shape, and may have an elliptic, rectangular, polygonal, or other planar shape.

As has been described above, a magnetic sensor according to one embodiment of the technology includes: a support member having at least one inclined surface inclined relative to a reference plane; a first magnetic detection element disposed on the at least one inclined surface and configured to detect a target magnetic field and generate a first detection signal; a second magnetic detection element disposed on the at least one inclined surface and configured to detect the target magnetic field and generate a second detection signal having a phase different from that of the first detection signal; and a conversion section that converts the first detection signal and the second detection signal into a first corrected signal and a second corrected signal, respectively. The conversion section is configured to change an amplitude of at least either one of the first and second detection signals to make a ratio of the amplitude of the second corrected signal to the amplitude of the first corrected signal different from a ratio of the amplitude of the second detection signal to the amplitude of the first detection signal.

In the magnetic sensor according to one embodiment of the technology, the conversion section may be configured so that the ratio of the amplitude of the second corrected signal to the amplitude of the first corrected signal is a value other than 1. The first detection signal may be a signal leading the second detection signal in phase. In such a case, the conversion section may be configured so that the ratio of the amplitude of the second corrected signal to the amplitude of the first corrected signal does not fall within a range of 1 or less.

In the magnetic sensor according to one embodiment of the technology, an angle that the at least one inclined surface forms with the reference plane may be in a range of 10° or more and 45° or less.

In the magnetic sensor according to one embodiment of the technology, the first magnetic detection element and the second magnetic detection element may each have a circular planar shape.

The magnetic sensor according to one embodiment of the technology may further include: a power supply port; a ground port; a first output port; a second output port; a first resistor section provided between the power supply port and the first output port; a second resistor section provided between the power supply port and the second output port; a third resistor section provided between the ground port and the first output port; and a fourth resistor section provided between the ground port and the second output port. Either one of the first and third resistor sections may include the first magnetic detection element. The other of the first and third resistor sections may include a third magnetic detection element disposed on the at least one inclined surface and configured to detect the target magnetic field and generate the first detection signal in cooperation with the first magnetic detection element. Either one of the second and fourth resistor sections may include the second magnetic detection element. The other of the second and fourth resistor sections may include a fourth magnetic detection element disposed on the at least one inclined surface and configured to detect the target magnetic field and generate the second detection signal in cooperation with the second magnetic detection element.

In the magnetic sensor according to one embodiment of the technology, each of the first and second magnetic detection elements may be a magnetoresistive element. The magnetoresistive element may include a magnetization pinned layer having a first magnetization whose direction is fixed, a free layer having a second magnetization whose direction is variable depending on the target magnetic field, and a gap layer located between the magnetization pinned layer and the free layer. A direction of the first magnetization of the magnetization pinned layer of the first magnetic detection element and a direction of the first magnetization of the magnetization pinned layer of the second magnetic detection element may intersect each other. Either one of the directions of the first magnetizations of the magnetization pinned layers of the first and second magnetic detection elements may intersect the reference plane.

The magnetic sensor according to one embodiment of the technology may further include a processor configured to generate a detection value having a correspondence with an angle to be detected using the first corrected signal and the second corrected signal. The processor may include the conversion section.

In the magnetic sensor according to one embodiment of the technology, the conversion section may include a resistor electrically connected to the first magnetic detection element or the second magnetic detection element.

In the magnetic sensor according to one embodiment of the technology, the at least one inclined surface may include a first inclined surface and a second inclined surface. The first magnetic detection element may be disposed on the first inclined surface. The second magnetic detection element may be disposed on the second inclined surface.

A magnetic sensor system according to one embodiment of the technology includes the magnetic sensor according to one embodiment of the technology and a magnetic field generator that generates the target magnetic field.

In the magnetic sensor system according to one embodiment of the technology, the magnetic sensor may be opposed to an outer periphery of the magnetic field generator. The magnetic sensor and the magnetic field generator may be configured so that a direction of the target magnetic field at a predetermined position rotates as a position of the magnetic field generator relative to the magnetic sensor changes.

Obviously, many modifications and variations of the technology are possible in the light of the above teachings. Thus, it is to be understood that, within the scope of the appended claims and equivalents thereof, the technology may be practiced in other example embodiments than the foregoing example embodiments.

What is claimed is:

1. A magnetic sensor comprising:
a support member having at least one inclined surface inclined relative to a reference plane;
a first magnetic detection element disposed on the at least one inclined surface and configured to detect a target magnetic field and generate a first detection signal, the first detection signal having a first amplitude with a maximum value and a minimum value;
a second magnetic detection element disposed on the at least one inclined surface and configured to detect the target magnetic field and generate a second detection signal having a phase different from that of the first detection signal, the second detection signal having a second amplitude with a maximum value and a minimum value; and a conversion section, wherein the maximum value and the minimum value of the first detection signal are equal to the maximum value and the minimum value of the second detection signal, and the conversion section is configured to convert the first detection signal and the second detection signal into a first corrected signal and a second corrected signal, respectively, the conversion section being configured to change at least either one of the first amplitude of the first detection signal and the second amplitude of the second detection signal to make a ratio of a second corrected amplitude of the second corrected signal to a first corrected amplitude of the first corrected signal different from a ratio of the second amplitude of the second detection signal to the first amplitude of the first detection signal, the first corrected amplitude being a half of a difference between a maximum value and a minimum value of the first corrected signal, the second corrected amplitude being a half of a difference between a maximum value and a minimum value of the second corrected signal.

2. The magnetic sensor according to claim 1, wherein the conversion section is configured so that the ratio of the second corrected amplitude of the second corrected signal to the first corrected amplitude of the first corrected signal is a value other than 1.

3. The magnetic sensor according to claim 2, wherein:
the first detection signal is a signal leading the second detection signal in phase; and
the conversion section is configured so that the ratio of the second corrected amplitude of the second corrected signal to the first corrected amplitude of the first corrected signal does not fall within a range of 1 or less.

4. The magnetic sensor according to claim 1, wherein an angle that the at least one inclined surface forms with the reference plane is in a range of 10° or more and 45° or less.

5. The magnetic sensor according to claim 1, wherein the first magnetic detection element and the second magnetic detection element each have a circular planar shape.

6. The magnetic sensor according to claim 1, further comprising:
a power supply port;
a ground port;
a first output port;
a second output port;
a first resistor section provided between the power supply port and the first output port;
a second resistor section provided between the power supply port and the second output port;
a third resistor section provided between the ground port and the first output port; and
a fourth resistor section provided between the ground port and the second output port, wherein
either one of the first and third resistor sections includes the first magnetic detection element,
another of the first and third resistor sections includes a third magnetic detection element disposed on the at least one inclined surface and configured to detect the target magnetic field and generate the first detection signal in cooperation with the first magnetic detection element, either one of the second and fourth resistor sections includes the second magnetic detection element, and
another of the second and fourth resistor sections includes a fourth magnetic detection element disposed on the at least one inclined surface and configured to detect the target magnetic field and generate the second detection signal in cooperation with the second magnetic detection element.

7. The magnetic sensor according to claim 1, wherein:
each of the first and second magnetic detection elements is a magnetoresistive element;
the magnetoresistive element includes a magnetization pinned layer having a first magnetization whose direction is fixed, a free layer having a second magnetization whose direction is variable depending on the target magnetic field, and a gap layer located between the magnetization pinned layer and the free layer;
a direction of the first magnetization of the magnetization pinned layer of the first magnetic detection element and a direction of the first magnetization of the magnetization pinned layer of the second magnetic detection element intersect each other; and
either one of the directions of the first magnetizations of the magnetization pinned layers of the first and second magnetic detection elements intersects the reference plane.

8. The magnetic sensor according to claim 1, further comprising a processor configured to generate a detection value having a correspondence with an angle to be detected using the first corrected signal and the second corrected signal.

9. The magnetic sensor according to claim 8, wherein the processor includes the conversion section.

10. The magnetic sensor according to claim 1, wherein the conversion section includes a resistor electrically connected to the first magnetic detection element or the second magnetic detection element.

11. The magnetic sensor according to claim 1, wherein:
the at least one inclined surface includes a first inclined surface and a second inclined surface;
the first magnetic detection element is disposed on the first inclined surface; and
the second magnetic detection element is disposed on the second inclined surface.

12. A magnetic sensor system comprising:
the magnetic sensor according to claim 1; and
a magnetic field generator that generates the target magnetic field.

13. The magnetic sensor system according to claim 12, wherein the magnetic sensor is opposed to an outer periphery of the magnetic field generator.

14. The magnetic sensor system according to claim 13, wherein the magnetic sensor and the magnetic field generator are configured so that a direction of the target magnetic field at a predetermined position rotates as a position of the magnetic field generator relative to the magnetic sensor changes.

15. A magnetic sensor comprising:
a support member having at least one inclined surface inclined relative to a reference plane;
a first magnetic detection element disposed on the at least one inclined surface and configured to detect a target magnetic field and generate a first detection signal, the first detection signal having a first amplitude that is a half of a difference between a maximum value and a minimum value of a waveform of the first detection signal if a direction of the target magnetic field changes with a predetermined period;

a second magnetic detection element disposed on the at least one inclined surface and configured to detect the target magnetic field and generate a second detection signal having a phase different from that of the first detection signal, the second detection signal having a second amplitude that is a half of a difference between a maximum value and a minimum value of a waveform of the second detection signal if the direction of the target magnetic field changes with a predetermined period; and a conversion section configured to convert the first detection signal and the second detection signal into a first corrected signal and a second corrected signal, respectively, the conversion section being configured to change at least either one of the first amplitude of the first detection signal and the second amplitude of the second detection signal to make a ratio of a second corrected amplitude of the second corrected signal to a first corrected amplitude of the first corrected signal different from a ratio of the second amplitude of the second detection signal to the first amplitude of the first detection signal, the first corrected amplitude being a half of a difference between a maximum value and a minimum value of a waveform of the first corrected signal if the direction of the target magnetic field changes with a predetermined period, the second corrected amplitude being a half of a difference between a maximum value and a minimum value of a waveform of the second corrected signal if the direction of the target magnetic field changes with a predetermined period.

16. The magnetic sensor according to claim 15, wherein the maximum value and the minimum value of the first detection signal are equal to the maximum value and the minimum value of the second detection signal.

* * * * *